United States Patent [19]

Kuhlman

[11] Patent Number: 4,486,007

[45] Date of Patent: Dec. 4, 1984

[54] EMERGENCY PAWL RELEASE SYSTEM FOR WINCHES

[75] Inventor: Clare Kuhlman, Platte County, Mo.

[73] Assignee: Intercontinental Engineering-Manufacturing Corporation, Kansas City, Mo.

[21] Appl. No.: 398,905

[22] Filed: Jul. 16, 1982

[51] Int. Cl.$^{3}$ .......................... B66D 5/32; F16D 41/12

[52] U.S. Cl. ....................................... 254/376; 60/636; 74/577 S

[58] Field of Search ........................ 254/376, 357, 391; 242/107; 74/577 R, 577 S; 60/636; 188/112, 82.3

[56] References Cited

U.S. PATENT DOCUMENTS

| | | | |
|---|---|---|---|
| 147,817 | 2/1874 | Bryant | 74/577 S |
| 248,883 | 11/1881 | Ralston | 74/577 S |
| 3,058,548 | 10/1962 | Stair | 188/112 |
| 3,240,474 | 3/1966 | Garnier | 254/287 X |
| 3,302,931 | 2/1967 | Blackburn | 254/376 |
| 3,803,942 | 4/1974 | Duggan | 254/376 X |
| 4,230,288 | 10/1980 | Föhl | 242/107 |

*Primary Examiner*—Stuart S. Levy
*Assistant Examiner*—David Werner
*Attorney, Agent, or Firm*—Kokjer, Kircher, Bradley, Wharton, Bowman & Johnson

[57] ABSTRACT

A hinged pawl and an emergency pawl release system for heavy duty winches such as those used to anchor semi-submersible drilling rigs. The pawl includes two sections hinged together at an overcenter knuckle joint and provided with flat bearing surfaces which hold the pawl in a rigid position engaged with a ratchet wheel on the winch drum. The pawl is normally engaged and released by a pneumatic cylinder. In an emergency situation involving a loss of electric power while the winch is heavily loaded, the pawl is collapsed about the knuckle joint by an air operated explosive actuator which applies an explosive release force to the pawl. The pneumatic control system for the explosive actuator releases both the clutch and the brake of the winch when the actuator is fired.

18 Claims, 8 Drawing Figures

| Fig. 1a. | Fig. 1b. |
| --- | --- |

EMERGENCY PAWL RELEASE SYSTEM FOR WINCHES

FIELD OF THE INVENTION

This invention relates in general to the field of heavy duty winches such as large towing winches for ocean vessels and mooring winches that serve to anchor semi-submersible drilling rigs. More particularly, the invention is directed to a pawl arrangement for positively locking the winch against rotation in one direction, and it also deals with an explosive release system for disengaging the pawl under emergency conditions.

BACKGROUND OF THE INVENTION

Towing operations on ocean vessels are normally carried out by large towing winches having drums around which the towing cable is wound. Mooring winches of generally similar construction serve to anchor semi-submersible drilling rigs in a fixed position over a well that is being drilled. In both cases, the winch is rotated by a drive system that is usually powered by an electric motor connected to the winch shaft by a clutch mechanism and a gear train. Large winches of this type are equipped with friction brakes that apply a braking force to the winch drum when applied.

The winches can be single units or multiple unit systems. The weight of the cable and the heavy sea conditions that are often encountered exert extremely heavy loads on the winch. To exemplify the size of the equipment necessary to handle the loads, it is not uncommon for the drums to weigh several hundred thousand pounds and for thousands of feet of cable or wire rope to be wound on the drum. The cable or wire rope can be several inches in diameter. Drive motors capable of producing hundreds of thousands of pounds of line pull are used. The dual band brakes that are commonly used are capable of withstanding several million pounds of force.

Both towing winches and mooring winches are ordinarily provided with a ratchet mechanism which positively locks the winch drum against rotation in a direction to pay out more cable. A typical arrangement includes a dog or pawl which acts against a ratchet wheel on the drum. In the case of a towing winch, the pawl eliminates the possibility of brake slippage at maximum loads and thus increases the resistance of the winch to shock loading. Also, the pawl permits smaller friction brakes to be used and prevents the cable from becoming lost in the event of loss of winch power. In the case of a mooring winch, the pawl eliminates movement except that caused by anchor slip. Due to the locking function of the pawl, the winch motive power can be diverted to the drilling equipment without relying wholly on the friction brakes to maintain the winch position. If there is an equipment malfunction, the locking pawl assures that the position of the drill rig is properly maintained.

The positioning of the pawl is controlled either manually or by means of an actuator such as a pneumatically or hydraulically powered cylinder. The pawl is engaged by rotating it into contact with the ratchet wheel on the winch drum, and the drum is slowly rotated until the tip of the pawl is firmly engaged in one of the notches in the ratchet wheel. So long as there is a force applied to the drum in the direction of the pawl engagement, the pawl is held in the engaged position to lock the winch against rotation. Rotation of the drum in the opposite direction is permitted as the pawl rides along the ratchet wheel into and out of excessive notches. Release of the pawl under normal conditions involves rotation of the winch drum away from the pawl and release of the force which holds the pawl against the ratchet wheel. Engagement and disengagement of the pawl is facilitated by minimizing the length of the pawl without diminishing its ability to withstand the compression loads that are applied to it by the winch drum.

If an emergency should arise such as a blow out of the well, it is sometimes necessary to move the drill rig from its position over the well in the absence of electrical power. Before the drill rig can be moved in an emergency situation, both the winch brakes and the pawl must be released without electrical power and with the winch drum under heavy load. The winch cannot be rotated due to the loss of its motive power, and the heavy load exerted on the pawl by the weight of the cable and the effect of sea forces makes it difficult if not impossible to disengage the pawl under these conditions.

The devices that have been proposed in the past for effecting emergency release of the pawl have not been satisfactory. Due to the absence of electric power, only air or hydraulic power is available. The need to develop extremely large release forces has resulted in attempts to construct large actuators that operate long levers. Under conditions of heavy winch loading, the force required to disengage the pawl exceeds the force that can be applied by a pneumatic or hydraulic device acting alone. Even if the necessary force can be produced, large actuators are unacceptable because their unduly large size cannot be accommodated in the limited space that is available. Also, the expense is excessive if not prohibitive. The emergency operating source, air or hydraulic fluid, must be very large in order to provide the required force, and this further detracts from the practicality of previously proposed emergency release devices. Another drawback is that the brakes must be released by a separate independent operation.

It has also been proposed that a cutting torch be used to physically cut the pawl or cable in an emergency situation. This type of operation requires the presence of a worker at the winch and can result in possibly serious personal injury. Furthermore, physically cutting the pawl or cable permanently damages the equipment and leads to delay that can be too great to meet the time constraints that are usually involved in releasing the pawl under emergency conditions. Again, the brakes must be released independently.

SUMMARY OF THE INVENTION

The present invention provides an improved pawl construction for winches and a practical and reliable emergency release system for disengaging the pawl in the event of an emergency. The pawl is formed by two hinged sections connected at a knuckle joint wich maintains the pawl in a rigid condition in its engaged position. Emergency release of the pawl is carried out by a pyrotechnic device that applies a controlled explosive force to the pawl at a strategic location in order to assure release of the pawl even under conditions of heavy winch loading.

It is an important object of the invention to provide, in a heavy duty winch, a pawl which can be quickly and easily engaged with and disengaged from a ratchet wheel on the winch drum in normal operation.

Another object of the invention is to provide a pawl that securely and rigidly locks the winch drum against back rotation and yet can be disengaged through the application of only a relatively small force. In this respect, the over center arrangement provided by the knuckle joint prevents the pawl from inadvertently collapsing and yet permits it to be collapsed relatively easily for disengagement.

Yet another object of the invention is to provide a pawl which is constructed in two sections that collapse in folded fashion to reduce the pawl size when disengaged. This assures that the pawl adequately clears the rotating winch drum to avoid interference with the winch operation.

A further object of the invention is to provide an emergency release device that operates in a reliable manner in the absence of electric power to effect immediate release of the pawl under heavy loading conditions. The explosive actuator which effects emergency release of the pawl is controlled by air so that loss of electric power has no effect on its operability.

An additional object of the invention is to provide an emergency release device which can be used repeatedly and which is controlled from a remote location.

Yet another object of the invention is to provide an emergency release device wherein the operating components are shielded from foreign materials, weather and other external forces.

A still further objects of the invention is to provide an emergency release device that applies a controlled explosive force to the pawl to assure emergency disengagement under even the most extreme conditions.

Another object of the invention is to provide an emergency release device having a control circuit that assures release of the winch brakes and clutch along with the pawl under emergency conditions.

An additional object of the invention is to provide an emergency release device of the character described that is maintained in an inoperative condition unless the pawl is in the engaged position. It is an important feature of the invention that the device cannot be exploded if the pawl is already released from the ratchet wheel.

Other and further objects of the invention, together with the features of novelty appurtenant thereto, will appear in the course of the following description.

DESCRIPTION OF THE DRAWINGS

In the accompanying drawings which form a part of the specification and are to be read in conjunction therewith and in which like reference numerals are used to indicate like parts in various views:

FIGS. 1*a* and 1*b* together are a fragmentary top plan view of a heavy duty winch equipped with a locking pawl and emergency release device constructed according to a preferred embodiment of the present invention, with portions broken away for purposes of illustration;

FIG. 1*c* is an organizational diagram indicating the manner in which FIGS. 1*a* and 1*b* are to be arranged;

DETAILED DESCRIPTION OF THE INVENTION

Figures 1B, 1C:
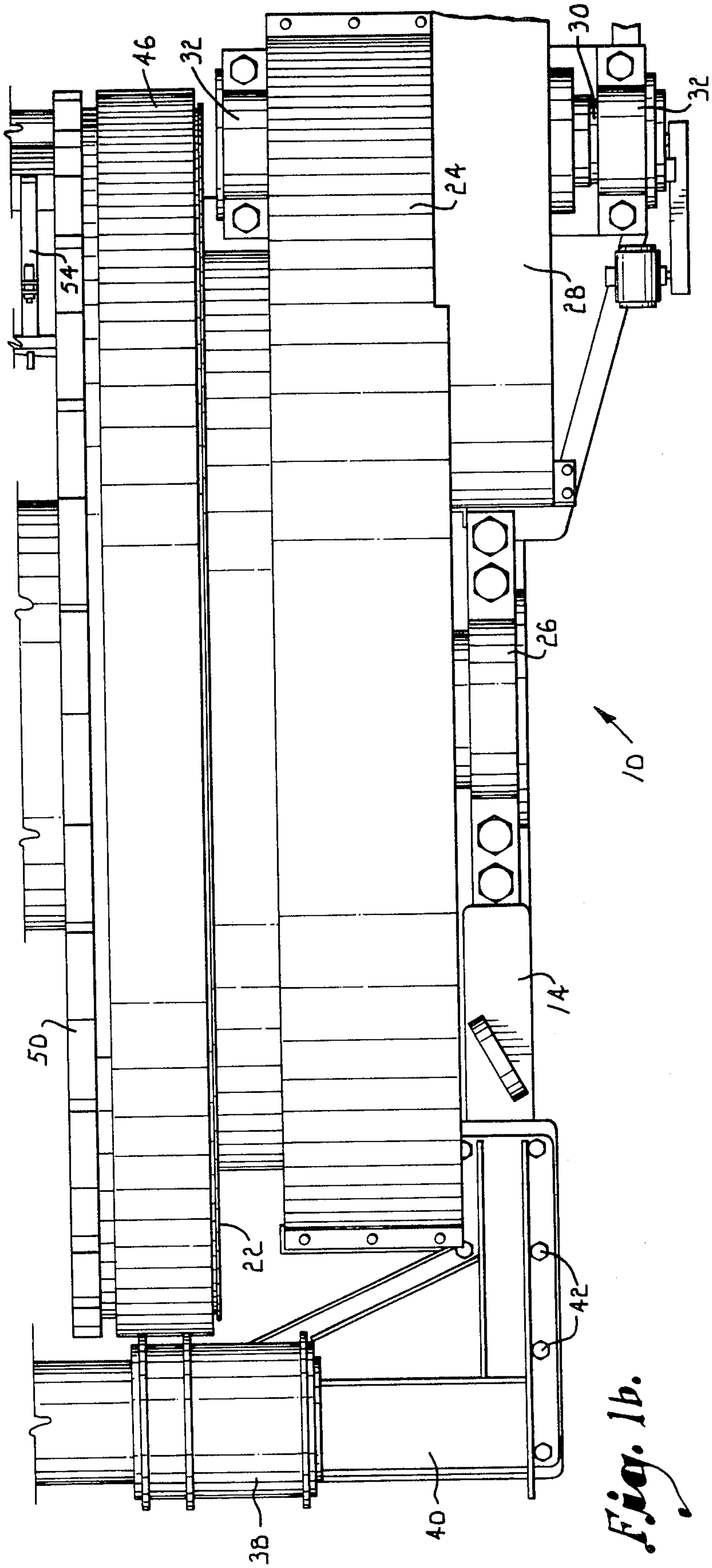

Referring now to the drawings in detail, numeral 10 general designates a large heavy duty mooring winch unit which serves to anchor a semisubmersible drill rig in a fixed position. The winch unit is constructed to withstand severe service conditions such as heavy seas and adverse weather.

Figure 1A:
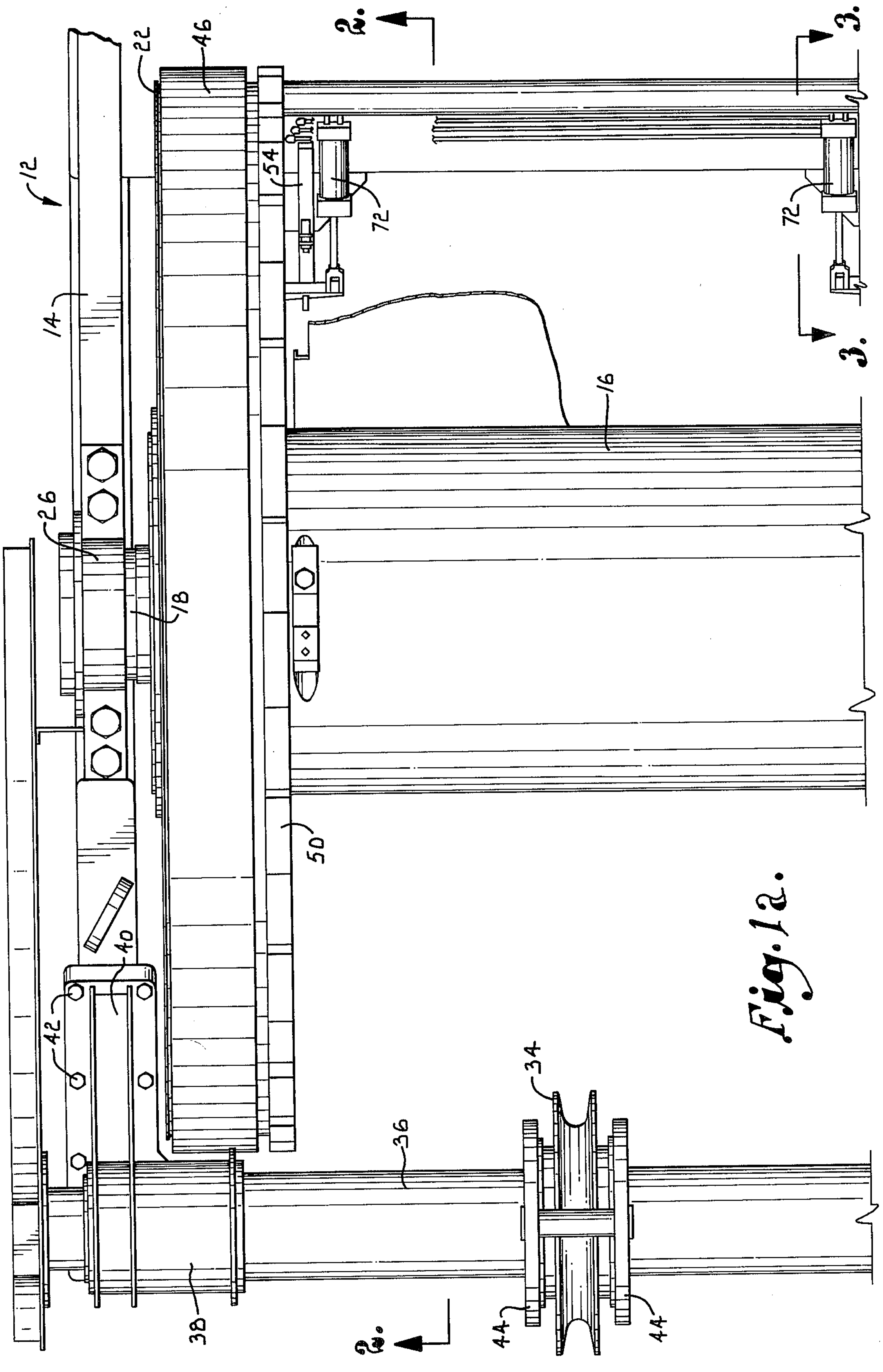

The winch unit has a large steel frame which is generally designated by numeral 12 and which has opposite sides 14 as shown in FIGS. 1*a* and 1*b*. A large winch drum 16 extends between the frame sides 14 and has a horizontal shaft 18 (FIG. 2) supported for rotation on the frame. The base portion of the frame includes a panel 20 which underlies the winch. The opposite ends of the winch drum 16 are provided with enlarged flanges 22.

A length of cable (not shown) is wound on the winch drum 16 and carries on its end an anchor (also not shown) used in the mooring operation. The cable is shielded by a cable shield 23 (FIG. 2) on the winch frame. A large reversible electric motor (not shown) operates through a clutch to drive a gear train which ultimately rotates the winch in opposite directions to reel the cable in and out. The final gear in the gear train is a large gear mounted on shaft 18 and enclosed within a gear cover 24. The opposite ends of shaft 18 are supported by bearings 26 mounted on the frame of the winch unit. Another gear in the gear train is enclosed within a gear cover 28 and is mounted on a shaft 30 supported by a pair of bearings 32 on the frame. The motor and the gear train which drive the winch drum 16 are conventional components.

The cable is drawn over a pulley 34 (FIG. 1*a*). The pulley is mounted on a horizontal shaft 36 having its opposite ends received in sleeves 38. The sleeves are mounted on supports 40 which are bolted at 42 to the frame of the winch unit. Brackets 44 between which pulley 34 is mounted are reciprocated along shaft 36 by a worm shaft (not shown) which turns with the winch drum 16.

Each of the flanges 22 of the winch is encircled by a brake band 46 forming part of a dual band brake system. One end of each brake band 46 is fixed, and tension is applied to the brake bands by air operated brake cylinders, one of which is shown schematically in FIG. 6 and designated by numeral 48. When the pistons of the brake cylinders are retracted, tension is applied to the brake bands 46, and friction surfaces of the bands are forced against the flanges 22 in order to apply a braking force to the winch. When the brake cylinders 48 are extended, the tension on the brake bands is relaxed, and the braking force is removed so that the winch can be freely rotated under the influence of the electric drive motor.

As thus far described, the mooring winch is constructed in a conventional matter for the most part.

In accordance with the present invention, a large ratchet wheel 50 is secured to the inside surface of each of the winch flanges 22. Each ratchet wheel 50 has a notched periphery which presents alternating notches 50a and teeth 50b (see FIG. 2), each having a generally rectangular shape. Cooperating with the ratchet wheels 50 are a pair of dogs or pawls which are generally indicated at 52. Each pawl 52 is constructed in essentially the same manner, and the details of only one of the pawls will be described.

Figure 2:
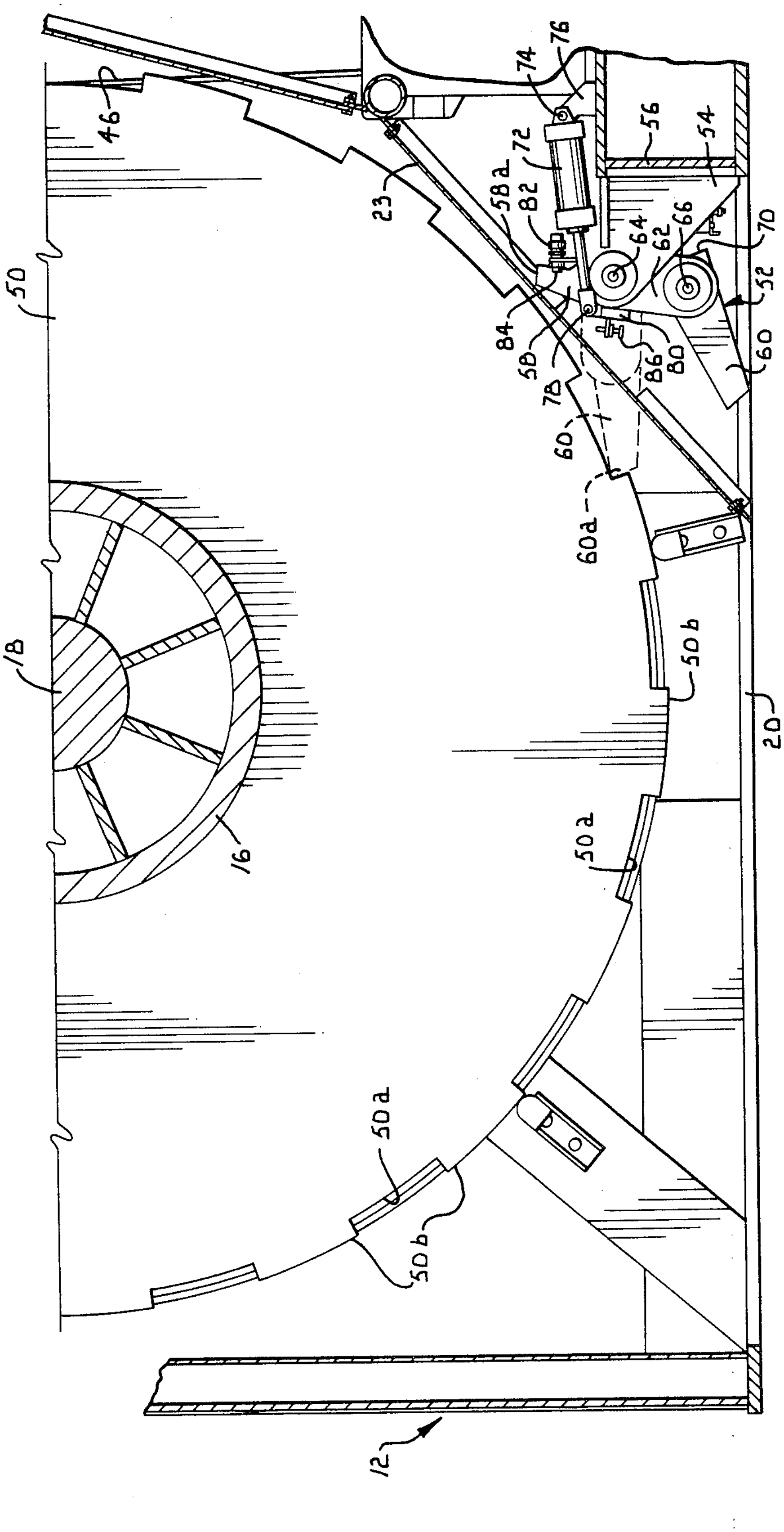
FIG. 2 is a fragmentary sectional view taken generally along line 2—2 of FIG. 1*a* in the direction of the arrows, with the broken lines indicating the engaged position of the pawl.
Figure 3:
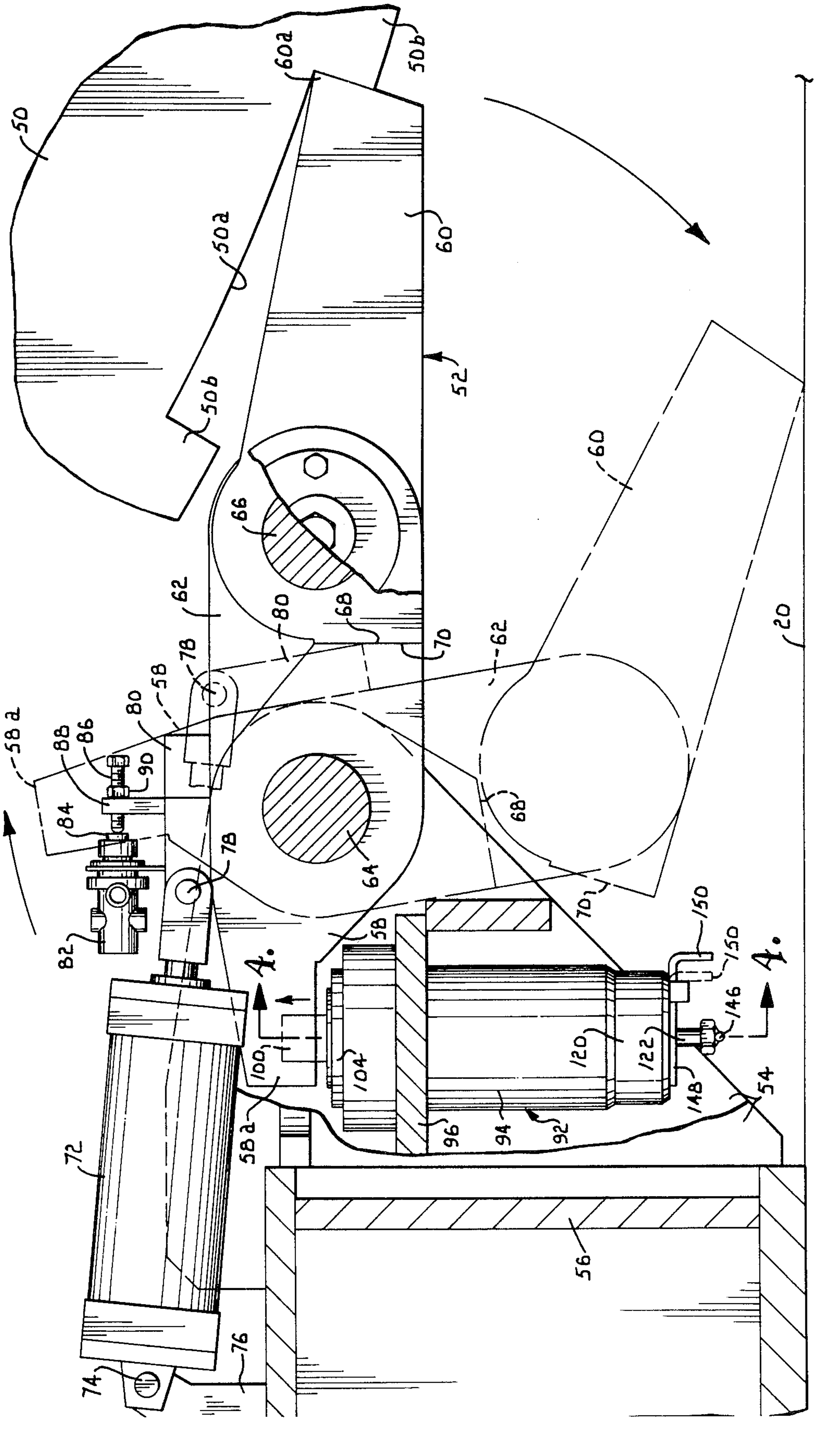
FIG. 3 is a fragmentary sectional view on an enlarged scale taken generally along line 3—3 of FIG. 1*a* in the direction of the arrows, with portions broken away for purposes of illustration and the broken lines indicating the release position of the pawl.

Referring now particularly to FIGS. 2 and 3, each pawl 52 is mounted between a pair of bracket plates 54 which project from a rigid beam 56 forming part of the winch frame 12. Each pawl includes two hinged together sections, a base section 58 and an end section 60. One end portion of the base section 58 is received between and secured to a pair of flat bars 62 having rounded opposite ends. A horizontal pivot pin 64 extends through one end of each bar 62 and also through a center portion of the base section 58 and through the mounting brackets 54. The pin 64 thus provides a pawl axis about which the base section of the pawl can pivot. The pawls are mounted adjacent to the bottom of the ratchet wheel 50.

One end of the end pawl section 60 is received between bars 62 and is pivotally connected with the bars by a horizontal pivot pin 66 which is offset from and parallel to pin 64. The hinge connection provided by pin 66 forms a knuckle joint about which the end pawl section 60 can pivot relative to the base section 58. Included in the knuckle joint is a flat end 68 of the base section which engages a flat end 70 of section 60 when the pawl is in the engaged position shown in solid lines in FIGS. 3. The flat ends 68 and 70 provide bearing surfaces which cooperate to lock the pawl in a rigid condition when it is engaged with the ratchet wheel 50. The pawl is generally straight and extends horizontally in the engaged position.

The end section 60 of the pawl has a tip 60a on its free end. The tip 60a is shaped to engage with the corner areas of the notches 50a in order to lock the winch against back rotation when the pawl is engaged. It is important to note that in the engaged position of the pawl, the center of pin 66 is located slightly above an imaginary straight line extending between the center of pin 64 and the tip 60a which provides the point of contact between the pawl and ratchet wheel. This over center arrangement of the knuckle joint, in cooperation with the bearing surfaces 68 and 70 locks the pawl in its rigid engagement position and prevents the pawl from collapsing when heaving compressive loads are applied by the winch. The distance of the knuckle joint above the abovementioned imaginary line determines whether or not the pawl will positively lock in engagement with the ratchet wheel and also determine the amount of force necessary to release the pawl. The flat bearing surfaces 68 and 70 prevent the pawl sections from hinging through beyond the rigid engagement position of the pawl.

Release of the pawl involves lowering the center of pin 66 below the imaginary straight line extending between tip 60a and pin 64. Once this occurs, the application of a compressive force to the pawl folds the pawl sections 58 and 60 about pin 66 and collapses the pawl from its rigid condition. When the pawl is moved to the fully released position shown in dashed lines in FIG. 3, the base section 58 is pivoted downwardly about pin 64, and the free end of section 60 contacts frame panel 20 such that sections 58 and 60 are folded in order to assure that they will not interfere with rotation of the winch drum. When released, the pawl 52 assumes the folded position under the influence of gravity.

The pawl 52 is normally engaged and released by a pneumatic actuating cylinder 72. The base end of cylinder 72 is pinned at 74 to a bracket 76 mounted on the beam 56. The rod end of cylinder 72 is pinned at 78 to a block 80 which is welded or otherwise secured to the base pawl section 58 and to the bars 62 at a location offset from pin 64. Retraction of cylinder 72 moves pawl 52 from the release position shown in dashed lines in FIG. 3 to the engaged position shown in solid lines. As the rod of cylinder 72 is retracted, the base pawl section 58 is pivoted about pin 64 in a counterclockwise direction as viewed in FIG. 3. After the bearing surfaces 68 and 70 have moved into contact with one another, further retraction of the cylinder causes the end section 60 to be lifted off of panel 20 until its tip 60a is eventually moved into contact with the notched periphery of the ratchet wheel 50. If necessary, the winch can be turned in a counterclockwise direction until tip 60a is engaged in one of the notches 50a in the position shown in FIG. 3. In this position, the pawl locks the winch against clockwise rotation so that the cable cannot be reeled out. However, reeling in of the cable is permitted since the winch can be rotated in a counterclockwise direction as the free end of the pawl rides in and out of successive notches 50a.

Release of the pawl is normally carried out by rotating the winch counterclockwise a short distance to relieve the load on the pawl and then extending the rod of cylinder 72. As the rod extends, the base section 58 is pivoted about pin 64 in a clockwise direction to lower the knuckle joint (pin 66) below a line defined between tip 60a and pin 64. Further extension of cylinder 72 drops the pawl to the fully released position where it is held by gravity until cylinder 72 is again extended to engage the pawl.

Mounted on top of one bracket plate 54 is a lock out valve 82 having a normally extended plunger 84 urged outwardly by a spring (not shown). When pawl 52 is in the engaged position, plunger 84 is depressed by a screw 86 which is mounted on a lug 88 extending from block 80. The lock out valve 82 is a normally closed valve that is open only when plunger 84 is depressed. Depression of the plunger occurs only when the pawl is engaged to carry the tip of screw 86 against the plunger. The extent to which screw 86 projects from lug 88 can be adjusted by loosening a lock nut 90 and threading the screw into or out of lug 88 as desired before again tightening the lock nut.

The present invention provides an emergency release system for effecting release of the pawl 52 in the absence of electrical power in an emergency situation. The emergency release system includes a pyrotechnic device generally designated by numeral 92. The pyrotechnic device is an air controlled explosive actuator that operates to apply an explosive force for disengaging the pawl from the ratchet wheel 50. The actuator has a generally cylindrical housing or body 94 which is mounted to a plate 96 connected with the winch frame at a location between the bracket plates 54. The upper end of the actuator is located immediately below a projecting heel portion 58a of the base pawl section 58. The heel portion 58a projects from the body of base section 58 and is located on the side of pin 64 opposite the flat bearing surface 70. The underside of the heel 58a provides a flat surface against which the pyrotechnic device acts when activated.

Figure 4:
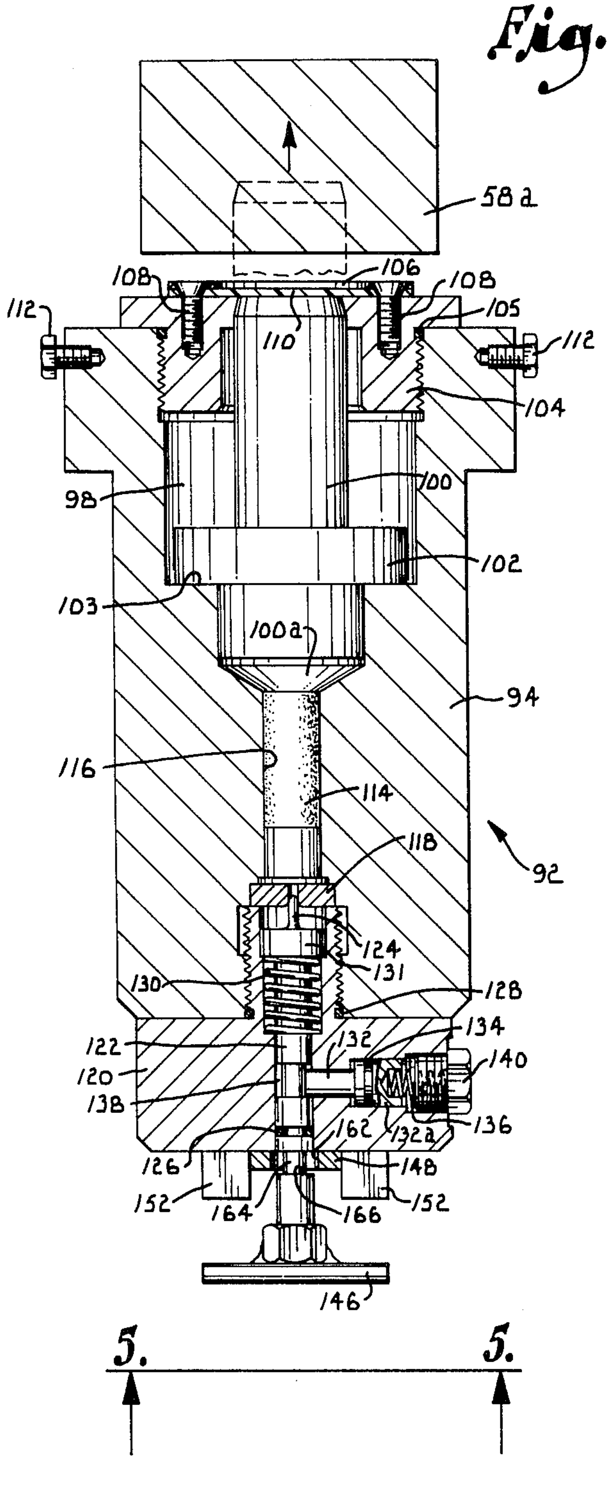
FIG. 4 is a fragmentary sectional view on an enlarged scale taken generally along line 4—4 of FIG. 3 in the direction of the arrows.

Referring now particularly to FIG. 4, the housing 94 has an internal piston chamber 98 containing a piston 100. The piston 100 has an enlarged flange 102 that normally rests on an annular shoulder 103 formed at the bottom of chamber 98 to limit the downward movement of the piston. A threaded cap 104 is screwed into the upper end of housing 94 and has an annular bottom surface which engages flange 102 to limit upward movement of the piston. An O-ring 105 seals cap 104 to the actuator body. The top end of the piston extends through the cap 104. A clamp ring 106 is clamped to the upper surface of cap 104 by screws 108 to clamp a gasket 110 to the cap. The upper side portion of housing 94 has a pair of diametrically opposed screws 112 threaded into it in order to secure the opposite ends of a chain (not shown) to the housing so that the chain can provide a handle for carrying the pyrotechnic device.

An explosive charge is used to explosively extend piston 100 from the normally retracted position shown in solid lines in FIG. 4 to the fully extended position shown fragmentarily in broken lines. The explosive charge is provided by a standard 12 gauge shotgun shell 114 which fits closely in a passage 116 formed in the housing immediately below the piston 100. The lower end of the bore which receives piston 100 is tapered at **100*a*. The cap end of shell 114 rests on top of a small retaining plate 118**.

The shell retainer 118 is held in place by a bottom end cap 120 which is threaded into the bottom end of housing 94 and against the bottom of the retainer 118. A firing pin 122 extends through the end cap 120 and has a projecting finger 124 on its upper end for exploding the shell 114. The finger 124 extends into a passage formed through the shell retainer 118 and is normally held a short distance below the cap of the shotgun shell. The firing pin 122 carries an O-ring 126 which provides a seal against the end cap 120. Another O-ring 128 provides a seal between the end cap and the body of the actuator.

The firing pin 122 is continuously urged upwardly toward shell 114 by a compression spring 130 which is coiled around the pin. One end of spring 130 acts against an enlarged head portion 131 of the firing pin, and the opposite end of the spring acts against an annular shoulder formed internally of the end cap 120.

A trigger pin 132 normally hold the firing pin 122 away from the shotgun shell 114 against the force applied by spring 130. The trigger pin 132 extends into a stepped passage formed in the side of the bottom end cap 120. The trigger pin has an enlarged head portion **132*a* which is provided with an O ring 134 for sealing against the end cap. A small compression spring 136 continuously urges pin 132 inwardly such that its end is normally held in a notch 138 formed in the firing pin 132. One end of spring 136 acts against the head portion 132*a* of the trigger pin, and the opposite end of the spring acts against a plug 140 which is threaded into the side of cap 120**.

The fit of the trigger pin 132 in notch 138 normally counteracts the force of spring 130 to hold the firing pin away from shell 114. Release of the trigger pin is accomplished by applying air under pressure through a passage 142 (FIG. 5) which extends into the side of cap 120 and terminates at the area between the head portion **132*a* of the pin and an opposing shoulder surface formed internally of the end cap 120. When air is applied through passage 142, the air pressure overcomes the force of spring 136 and forces pin 132 outwardly to remove its inner end from the notch 138. The firing pin 122 is then released, and spring 130 propels the firing pin toward shell 114. Finger 144 contacts the cap of the shotgun shell to explode it, and the explosion forcefully moves piston 100 to the extended position. Air is supplied to passage 142 through a fitting 144 which is threaded into the side of the end cap 120**.

The lower end of the firing pin 122 extends out of the actuator body and is provided with a handle 146. The handle is located at an accessible position and is used to reset the actuator after it has been fired. Such resetting is accomplished by pulling handle 146 downwardly to permit the end of pin 132 to enter notch 138.

The explosive actuator can be manually locked out of service by operating a slide lock 148 which facilitates safe handling of the actuator. The lock 148 is in the form of a plate having a downturned handle 150 on one end to facilitate sliding of the lock. The lock is secured to the bottom of cap 120 between a pair of blocks 152. The lock 148 is provided with two slots 154 near its opposite ends. Shoulder screws 156 fitted with washers 158 extend through the slots 154 and are threaded into cap 120 to mount the lock for limited sliding movement.

The center of lock 148 is provided with a key hole opening having a narrow slot portion 160 and a larger round portion 162. When the lock is in the release position shown in FIG. 5, the round opening 162 registers with the axis of the firing pin 122. As shown in FIG. 4, the firing pin has a reduced diameter stem portion 164 that extends through the opening 162 when the firing pin is in the set position. A flat annular shoulder 166 is formed at the lower end of stem 164 and is located adjacent the lower surface of the lock 148. The diameter of the firing pin at the shoulder is sufficient to fit freely through the round opening 162 but is too large to fit through the narrower slot 160. Consequently, when the lock 148 is slid to its locking position (see the broken line view of FIG. 3), the stem 164 fits closely through slot 160, and the shoulder 166 engages the lock on both sides of the slot to prevent the firing pin 122 from moving inwardly against the shell 114. Thus, if the trigger pin 132 is released while the lock is on the locking position, the firing pin cannot explode the shotgun shell 114.

Figure 6:
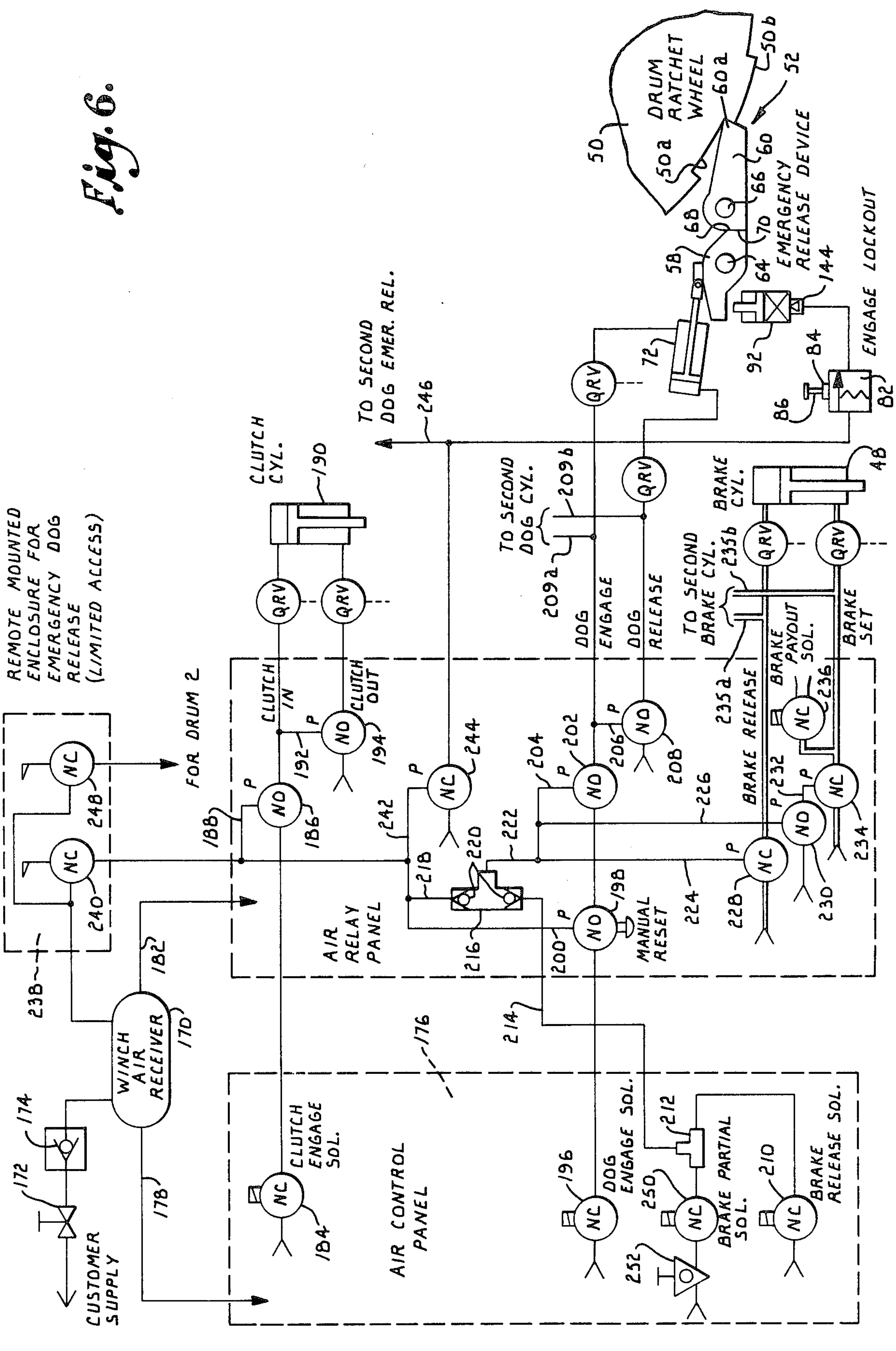
FIG. 6 is a schematic view of the pneumatic circuit that controls the operation of the winch components, including the pawl and the emergency release device.

FIG. 6 schematically illustrates a control system which controls the operation of the clutch, brakes, pawl, and the explosive release device. The pneumatic control circuit includes an air receiver 170 which holds a supply of pressurized air. The air is supplied to the receiver 170 from the main air system of the drill rig through a manual valve 172 and a check valve 174 which prevents back flow of air from the receiver 170 to the main supply. The air receiver is isolated from the main air supply of the drilling rig.

The air receiver 170 is connected to an air control panel 176 by line 178 and to an air relay panel 180 by line 182. A normally closed solenoid valve 184 controls the clutch in the drive system of the winch. Valve 184 opens when energized with electric current from the electric power system of the drilling rig. Located downstream of valve 184 is a normally open valve 186 on the air relay panel 180. Valve 186 has a pilot line 188 that closes the valve when pressurized. The outlet line from valve 186 connects with the "clutch in" side of a clutch cylinder 190 and also with a pilot line 192 that controls a normally open pilot controlled valve 194. Valve 194 is located on the air relay panel, and its inlet side is connected with line 182. The outlet side of valve 194 leads to the "clutch out" side of cylinder 190. The clutch cylinder 190 is extended to engage the clutch when valve 186 is open. Conversely, the clutch cylinder releases the clutch when valve 194 is open to retract the clutch cylinder.

The air control panel 176 also includes a "dog engage" solenoid valve 196 which is normally closed but which opens when energized with electric current. Line 178 supplies the inlet side of valve 196, and the outlet side of the valve leads to a normally open valve 198 on the air relay panel. Valve 198 has a pilot line 200 which closes the valve when pressurized. Once valve 198 has been closed, it must be manually reset to the open position.

The outlet side of valve 198 connects with a pilot operated valve 202 which is normally open but which closes when its pilot line 204 is pressurized. The outlet side of valve 202 connects with the "engage" side of the pawl actuating cylinder 72 and also with a pilot line 206 for a normally open valve 208. The inlet side of valve 208 receives air from line 182, and its outlet side connects with the "release" side of cylinder 72. The outlet sides of valves 202 and 208 also connect with lines **209*a* and 209*b*** which lead to the respective "engage" and "release" sides of the actuating cylinder for the second pawl associated with the winch.

A "brake release" solenoid valve 210 on the air control panel is supplied with air by line 178. Valve 210 is normally closed but is open when energized with electric current. The outlet side of valve 210 connects with one inlet of a T fitting 212 having a single outlet line 214 leading to one inlet of another T fitting 216. The other inlet of fitting 216 is supplied by line 218. A pair of check valves 220 are included in fitting 216 (and in fitting 212 to assure that all incoming air from either line 214 or 218 is directed to the single outlet line 222 of the fitting 216 (and to prevent air from venting between valves 210 and 250.

Line 222 connects with the pilot line 204 of valve 202 and also with pilot lines 224 and 226 of respective valves 228 and 230 which are each supplied by line 182. Line 228 is a normally closed valve that opens when its pilot line 224 is pressurized. The outlet side of line 228 leads to the "brake release" side of the brake cylinder 48.

Valve 230 is supplied by line 182 and is a normally open valve that closes when its pilot line 226 is pressurized. The outlet side of valve 230 connects with a pilot line 232 of a normally closed valve 234 supplied by line 182. The outlet side of valve 234 connects with the "brake set" side of cylinder 48. The outlet sides of valves 228 and 234 also lead via lines **235*a* and 235*b*** to the respective "brake release" and "brake set" sides of the brake cylinder for the second brake band of the winch.

A normally closed "brake pay out" solenoid valve 236 also connects with the brake set side of each brake cylinder. Valve 236 opens when energized with electric current.

The controls for operating the emergency pawl release system are contained within an enclosure 238 which is preferably located on a deck separate from the main controls. The emergency release system is activated by a normally closed valve 240 which is located within the enclosure 238 and which can be opened manually or in any other desired manner. Air is supplied to the inlet side of valve 240 from the air receiver 170. The outlet side of valve 240 connects with pilot lines 188 and 200 for valves 186 and 198. The outlet side of valve 240 also connects with the second inlet line 218 for fitting 216 and with a pilot line 242 for a normally closed valve 244. The inlet side of valve 244 is supplied by line 182, and its outlet side connects with the inlet side of the lock out valve 82. The outlet side of the lock out valve connects with the air inlet fitting 144 for the explosive actuator 92.

It should be noted that the explosive actuator for the second pawl of the winch is operated by line 246 which is supplied by valve 244. It should also be noted that, if the winch unit includes a second winch drum, the enclosure 238 can be provided with a second valve 248 which controls the emergency release device for the second winch in the same manner as valve 240 controls the first emergency release device. Valve 240 and 248 can be three-way ball valves or any other suitable type of valve.

In operation of the winch, the semi-submersible drilling rig on which it is mounted is moored or anchored in a fixed position over a well that is being drilled. A suitable anchor is applied to the end of the cable and the cable is reeled out by rotating the winch drum 16 in the proper direction. Once the anchor has been properly set, the winch brakes are applied and both of the pawls 52 are engaged to prevent the winch drum from turning in a direction to reel out additional cable. Once the brakes and pawls have been engaged, the electrical power that serves the winch can be wholly diverted to the drilling equipment.

In normal operation, the clutch is engaged and disengaged by operating the "clutch engage" solenoid valve 184. When valve 184 is deenergized, it is in the closed position and air is not supplied to the "clutch in" side of the clutch cylinder 190. However, valve 194 is open due to the absence of pressure in its pilot line 192, and air is supplied through valve 194 to the "clutch out" side of the clutch cylinder 190 in order to release the clutch. Conversely, when valve 184 is energized, it opens and supplies air through valve 186 to the "clutch in" side of cylinder 190 and also to the pilot line 192. The pilot pressure closes valve 194, and the clutch is engaged for driving of the winch drum 16 through the gear train powered by the electric winch motor.

The winch brakes are controlled in normal operation by the "brake release" solenoid valve 210. When valve 210 is deenergized, it is closed and pilot lines 224 and 226 are not pressurized. Accordingly, the normally closed brake release valve 228 is closed and the normally open valve 230 is open to pilot the brake set valve 234 to the open position. Air is then supplied to the brake set side of cylinder 48, but not to the brake release side. This sets the winch brakes.

Energization of solenoid valve 210 opens it and pressurizes pilot lines 224 and 226 through T fittings 212 and 216. Valve 228 then opens to supply the brake release side of the brake cylinder 48, and valve 230 is piloted to the closed position. Valve 234 is then closed, and the brake set side of cylinder 48 is not pressurized. Both brakes are released under these conditions.

It should be noted that the control circuit includes a "brake partial" solenoid valve 250 which is supplied by line 178 at a reduced air pressure due to the presence of a pressure reducing valve 252. Energization of valve 250 has the same effect as energization of the brake release valve 210, except that the air that is supplied to the pilot lines 224 and 226 is at a reduced pressure to effect only partial release of the brakes.

In normal operation, the pawls 52 are operated by the "dog engage" solenoid valve 196. When it is deenergized, it is closed to cut off air to the "dog engage" side of cylinder 72 and also to the pilot line 206 for valve 208. Valve 208 is thus opened to supply the release side of cylinder 72. This extends the rod of cylinder 72 and collapses pawls 52 to the dashed line position shown in FIG. 3, thus releasing the pawls.

When valve 196 is energized with electric current, the pawls 52 are moved to the engaged positions. Valve 196 is then opened to supply air through the normally open valves 198 and 202, thus supplying the "dog engage" side of cylinder 72 and piloting valve 208 closed. Cylinder 72 then retracts to raise pawl 52 to the rigid fully engaged position shown in solid lines in FIG. 3.

It should be noted that, if the brake release solenoid 210 is energized to release the brake, lines 214 and 22 are pressurized to apply pressure to the pilot line 204 for the normally open valve 202 in the "dog engage" line. Valve 202 is piloted to the closed position to prevent engagement of the pawl in this situation. Accordingly, it is necessary before the pawl can be engaged to first deenergize solenoid valve 210 to apply the winch brakes.

The explosive emergency release devices are operated if an emergency situation arises where electrical power is unavailable and the pawls must be quickly released. For example, such a situation develops in circumstances where there is a well blowout and the drill rig must be removed from a position over the well in the absence of electrical power. Without electrical power available to the solenoid valves, they are all inoperative, and the clutch, brake, and pawl cannot be controlled in the normal fashion.

The emergency release system is activated by opening the normally closed valve 240 located in the remote enclosure 238. This results in automatic release of the clutch, automatic release of the brakes, and automatic release of both pawls.

When valve 240 is opened, the clutch is released due to the application of pressure to pilot line 188. Valve 186 then closes to prevent engagement of the clutch while assuring that valve 194 is open to effect retraction of the clutch cylinder 190 and release of the clutch.

The opening of valve 240 also releases the winch brakes. The pressure that is applied to line 218 is transmitted through T-fitting 216 to line 222 and to pilot lines 224 and 226. The brake release valve 228 is thus piloted open to apply pressure to the extend side of the brake cylinders 48. Valve 230 is piloted closed, and valve 234 is closed to prevent the brakes from being set. The pressure applied to the brake release line releases both brakes.

The opening of valve 240 also pressurizes lines 200 and 204 in order to pilot valves 198 and 202 to the closed position. This removes pressure from the "dog engage" side of cylinder 72 and open valve 208 to apply pressure to the "dog release" side of the cylinder, thereby causing the cylinder to extend to effect the collapsed condition of each panel.

Figure 5:
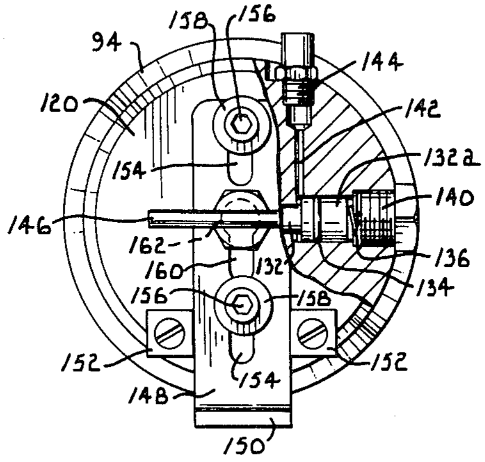
FIG. 5 is a bottom plan view of the emergency release device taken generally along line 5—5 of FIG. 4 in the direction of the arrows.

When valve 240 is opened, pilot line 242 is pressurized to open valve 244, thus supplying air through the valve and through the lockout valve 82 to the inlet fitting 144 of the explosive actuator 92. Referring additionally to FIGS. 4 and 5, the air supplied to fitting 144 is transmitted through passage 142 to force the trigger pin 132 out of notch 138 against the pressure of spring 136. The firing pin 122 is then released, and spring 130 forces finger 124 against the cap of the shotgun shell 114 in a manner to fire the explosive powder charge in the shell. The resulting explosion applies a forceful explosive force against piston 100 and extends it forcefully against the flat bottom surface of heel portion 58*a* of the base pawl section. The explosive force pivots pawl section 58 in a clockwise direction (as viewed in FIG. 3) about pin 64 and lowers pin 66 below the imaginary line extending between tip 60*a* of the pawl and the pawl axis 64. The pawl is then collapsed and the compressive force applied to it by the heavily loaded winch drum effects a complete collapse and complete release of the pawl to the dashed line position of FIG. 3.

It is again pointed out that, if lock 148 is in the locking position, the firing pin 122 cannot engage shell 114 and the explosive device cannot be exploded. Also, if valve 240 is opened and pawl 52 is not in the fully engaged position, the normally closed lockout valve 82 is in the closed position to prevent the application of air to the explosive actuator. The lockout valve thus assures that the actuators can be exploded only when the pawls are fully engaged. If valve 240 is operated while the pawl is disengaged, theclutch and brakes release in the manner indicated since the lock out valve 82 has no effect on the clutch or brake lines.

After the explosive emergency release device has been initially fired to release the pawls, the winch brakes can be controlled from the remote enclosure 238 by opening and closing valve 240. Due to the lack of electrical power, valves 210 and 250 are closed. However, valve 240 can be opened to supply lines 224 and 226 in order to release the brakes and can be closed to set the brakes. Control of the brakes in this manner can be carried out for approximately ten set and release cycles before exhausting the air supply in the isolated receiver 170.

As previously indicated, the opening of valve 240 causes valve 198 to be piloted to the closed position. Before the pawls can be engaged again, it is necessary for valve 198 to be manually reset. This prevents engagement of the pawls until the emergency has passed and the system has been intentionally reset by positive action.

The explosive force applied to the pawl by the actuator 92 is much greater than the forces that can be generated by devices operated solely by air, hydraulic fluid, spring force, gravity or any combination thereof. The pyrotechnic device achieves an extremely high force with only relatively small movement due to the confinement of the explosive force within the body of the actuator. Since the explosive shell 114 is the only component of the actuator that is destroyed when the device is fired, it can be reused. The bottom cap 120 can be unthreaded to permit replacement of the shotgun shell prior to reassembling the actuator for reuse. It is also important to note that the operating components are sealed within the housing 94 and are thus effectively shielded from foreign material, moisture, and other external forces. The actuator can be stored for extended periods of time without significant adverse affects.

The force developed by the explosive actuator depends upon several factors, including the amount and type of the explosive charge, the expansion volume, the area of the piston against which the explosive force acts, and the mass of the piston. An actuator constructed in the manner described herein provides sufficient force to disengage the pawl even under the most severe conditions of winch loading.

The hinged construction of the pawls 52 facilitates emergency release since the base pawl section 58 must be pivoted only a relatively short distance to cause the pawl to collapse. At the same time, the knuckle joint and the flat bearing surfaces 68 and 70 securely maintain the pawl in a rigid condition to assure that it will not inadvertently collapse in the engaged position. When engaged in its rigid condition, the pawl effectively resists the compression loads that are applied to it and transmits the forces applied to the winch to the sturdy base frame of the winch unit. The knuckle joint of the pawl prevents it from "hinging through" or otherwise collapsing in other than the intended manner.

From the foregoing, it will be seen that this invention is one well adapted to attain all the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative and not in a limiting sense.

Having thus described the invention, I claim:

1. In a heavy duty winch having a frame, a rotatable winch drum on the frame for reeling cable in and out, a ratchet wheel on the winch drum, and a pivotal pawl on the frame engageable with the ratchet wheel to lock, the winch drum against rotation in one direction, the combination therewith of:

power means for releasing the pawl from the ratchet wheel under normal conditions;

explosive means for applying an explosive emergency release force to the pawl when said explosive means is activated, said release force being applied to the pawl in a direction to disengage the pawl from the ratchet wheel to effect a release position of the pawl wherein rotation of the winch drum is permitted;

fluid control means for activating said explosive means under the influence of fluid pressure and independently of said power means;

and wherein said explosive means includes an explosive actuator having a housing mounted on the frame at a location adjacent the pawl;

an extensible piston in said actuator housing having a normally retracted position and being movable to an extended position acting against the pawl in a direction to effect the release position of the pawl; and an explosive charge confined in said housing adjacent said piston to explosively force the piston to the extended position thereof upon firing of said explosive charge, said fluid control means being operable to fire the explosive charge.

2. The invention of claim 1, including manually operated and released means for preventing firing of said explosive charge.

3. The invention of claim 1, wherein said fluid control means includes:

a trigger element having a normally engaged position preventing firing of said explosive charge and a release position effecting firing of the charge;

a fluid circuit leading to said trigger element and applying fluid thereto in an open condition of the circuit in a manner to move the trigger element to the release position; and a valve in said circuit having a first position wherein the open condition of the circuit is effected and a second position preventing application of fluid to the trigger element, whereby movement of said valve to the first position effects firing of said explosive charge.

4. The invention of claim 3, including a lock out valve in said circuit having a normally closed position preventing application of fluid to the trigger element regardless of the position of the first mentioned valve and an open position only when the pawl is engaged with the ratchet wheel, said circuit being in the open condition only when the first mentioned valve is in its first position and said lock out valve is in its open position.

5. The invention of claim 1, wherein said explosive actuator includes:

a firing pin in said housing having a normal position and a firing position wherein the firing pin effects firing of said explosive charge;

means for urging said firing pin toward the firing position;

a trigger element in said housing having an engaged position wherein the trigger element holds said firing pin in its normal position and a release position wherein the firing pin is released for movement to the firing position under the influence of said urging means; and yieldable means for biasing said trigger element toward its engaged position, said fluid control means being operable to apply fluid to said trigger element in opposition to said yieldable means at sufficient pressure to move the trigger element to the release position thereof.

6. The invention of claim 5, including handle means on said firing pin at an accessible location for manually resetting the firing pin to its normal position.

7. The invention of claim 5, including manually engageable and releasable lock means for locking the firing pin in the normal position when engaged.

8. An emergency pawl release system for a heavy duty winch having a rotatable winch drum, a rotative drive system for the winch drum, a clutch in the drive system, a fluid operated clutch actuator for controlling the clutch, a brake for applying braking force to the winch drum, a fluid operated brake actuator for controlling the brake, a ratchet on the winch drum, a pawl for engaging the ratchet to lock the winch drum, and a fluid operated pawl actuator for controlling the pawl, said release system comprising:

a source of fluid under pressure;

fluid operated explosive means for explosively releasing the pawl from the ratchet when fluid pressure is applied to said explosive means;

a first fluid line extending from said source to said explosive means;

an emergency valve in said fluid line having an open position wherein the first fluid line is open to fluid flow and a closed position wherein the first fluid line is blocked to prevent application of fluid to said explosive means, whereby opening of the emergency valve is an emergency situation effects application of fluid pressure to said explosive means to release the pawl from the ratchet;

a second fluid line extending from said source to said clutch actuator for applying fluid pressure to the clutch actuator in a manner to release the clutch when the second fluid line is open to fluid flow;

clutch valve means in said second fluid line having an open condition wherein the second fluid line is open to fluid flow and a closed condition wherein the second line is blocked;

a third fluid line extending from said source to said brake actuator for applying fluid pressure to the brake actuator in a manner to release the brake when the third fluid line is open to fluid flow;

brake valve means in said third fluid line having an open condition wherein the third fluid line is open to fluid flow and a closed condition wherein the third fluid line is blocked; and means for effecting the open condition of the second and third fluid lines whenever said emergency valve is in the open position.

9. The invention of claim 8, including:

a fourth fluid line extending from said source to said pawl actuator for applying fluid pressure to the pawl actuator in a manner to release the pawl from the ratchet when the fourth fluid line is open to fluid flow;

pawl valve means in said fourth fluid line having an open condition wherein the fourth fluid line is open to flow and a closed condition wherein the fourth fluid line is blocked; and means for effecting the open condition of said pawl valve means whenever said emergency valve is in the open position.

10. The invention of claim 9, wherein said pawl valve means includes a resettable valve which must be manually reset to effect the closed condition of said pawl valve means once the pawl valve means has been in the open condition.

11. The invention of claim 8, including a lockout valve in the first fluid line having a normally closed position blocking said first fluid line and an open position opening the first fluid line when the emergency valve is in its open position, said lockout valve being in the open position thereof only when the pawl is engaged with the ratchet whereby said explosive means is enabled only the the pawl is engaged with the ratchet.

12. A heavy duty winch comprising:

a frame;

a winch drum mounted for rotation on said frame and adapted to receive a length of cable;

drive means for rotating said winch drum to reel the cable in and out;

a ratchet wheel on said cable drum having a curved periphery provided with a plurality of notches;

a pawl mounted on said frame for movement between an engaged position wherein said pawl is engaged in a notch of the ratchet wheel in a manner to lock the winch drum against rotation in one direction and a release position wherein said pawl is released from the ratchet wheel;

power means for effecting movement of said pawl between the engaged and release positions under normal conditions;

brake means having an engaged condition applying braking force to the winch drum and a release condition releasing the brake force;

a drive train connecting said drive means and winch drum, said drive train including clutch means having an engaged condition drivingly connecting said drive means with the winch drum and a release condition disconnecting the winch drum from said drive means;

fluid operated explosive means for applying an explosive release force to said pawl when activated, thereby moving the pawl to its release position under emergency conditions when said power means is disabled;

means for selectively applying fluid pressure to said explosive means for activation thereof; and means for effecting the release condition of said brake means and the release condition of said clutch means when fluid pressure is applied to said explosive means.

13. A winch as set forth in claim 12, wherein said explosive means includes:

an explosive actuator having a housing mounted on the frame;

a piston in said housing having a normally retracted position wherein the piston is located adjacent the pawl when the pawl is in the engaged position, and an extended position wherein the piston is moved against said pawl to apply a moment force thereto in a direction to move the pawl to the release position;

an explosive charge in said housing operable when exploded to explosively force said piston from the retracted position to the extended position; and means for exploding said charge to effect emergency release of the pawl upon application of fluid pressure to said explosive means.

14. A winch as set forth in claim 13, wherein said means for exploding said charge includes:

a firing pin in said housing movable between a normal position removed from the explosive charge and a firing position wherein the firing pin impacts the charge to effect explosion thereof;

yieldable means for urging said firing pin toward the firing position;

a trigger element in the housing normally holding said firing pin in its normal position; and said means for selectively applying fluid pressure applies fluid to said trigger element in a manner to release same from the firing pin, whereby said yieldable means moves the firing pin to the firing position for explosion of said charge.

15. A winch as set forth in claim 14, including releasable lock means for locking said firing pin against movement to the firing position independently of said trigger element.

16. A winch as set forth in claim 14, including:

a valve for controlling said fluid applying means in a manner to prevent application of fluid to said trigger element in a closed position of the valve, said valve having an open position permitting application of fluid to the trigger element; and means for maintaining said valve in the closed position when the pawl is in the release position and for maintaining said valve in the open position when the pawl is in the engaged position, whereby fluid can be applied to the trigger element for release of the firing pin only in the engaged position of the pawl.

17. A heavy duty winch comprising:

a frame;

a winch drum mounted for rotation on said frame and adapted to receive a length of cable;

drive means for rotating said winch drum to reel the cable in and out;

a ratchet wheel on said cable drum having a periphery provided with a plurality of notches;

a pawl mounted on said frame for movement between an engaged position wherein said pawl is engaged in a notch of the ratchet wheel in a manner to lock the winch drum against rotation in one direction and a release position wherein said pawl is released from the ratchet wheel;

power means for effecting movement of said pawl between the engaged and release positions under normal conditions;

fluid operated explosive means for applying an explosive release force to said pawl when activated, thereby moving the pawl to its release position under emergency conditions when said power means is disabled;

means for applying fluid to said explosive means for activation thereof; and means for disabling said fluid applying means to prevent same from applying fluid to said explosive means unless said pawl is in the engaged position, whereby said explosive means can be activated only when said pawl is in the engaged position.

18. The invention of claim 17, wherein said explosive means includes:

a housing on the frame;

a piston in said housing movable between a normally retracted position and an extended position wherein the piston acts on said pawl in a direction to move the pawl to its release position; and an explosive charge in said housing for applying an explosive force against said piston to forcefully move the piston to the extended position when said charge is exploded, said applying means being selectively operable to explode said charge.

* * * * *